United States Patent [19]

Puskas

[11] Patent Number: 5,005,785

[45] Date of Patent: Apr. 9, 1991

[54] HIGH DRAG SLIDER REEFING SYSTEM FOR PARACHUTES

[75] Inventor: Elek Puskas, Mt. Holly, N.J.

[73] Assignee: Para-Flite, Inc., Pennasuken, N.J.

[21] Appl. No.: 815,056

[22] Filed: Dec. 31, 1985

[51] Int. Cl.$^5$ .............................................. B64D 17/62
[52] U.S. Cl. .................................................. 244/152
[58] Field of Search ............... 244/142, 145, 152, 147, 244/149

[56] References Cited

U.S. PATENT DOCUMENTS

| | | | |
|---|---|---|---|
| 2,566,585 | 9/1951 | Smith | 244/152 |
| 2,993,667 | 7/1961 | Cushman | 244/142 |
| 4,253,627 | 3/1981 | Matsuo | 244/152 |
| 4,540,145 | 9/1985 | Matsuo | 244/152 |

FOREIGN PATENT DOCUMENTS 365609 12/1938 Italy ..................................... 244/152

Primary Examiner—Galen Barefoot
Attorney, Agent, or Firm—Fleit, Jacobson, Cohn, Price, Holman & Stern

[57] ABSTRACT

A slider type of reefing device physically restricts opening of a parachute canopy through its suspension lines, and hingedly mounts a flow deflecting flap to aerodynamically divert the inflow of inflating air to a ram-air inflated airfoil canopy. Aerodynamic drag of a slider baffle retards descent of the reefing slider and flow deflecting flap on the suspension lines.

10 Claims, 4 Drawing Sheets

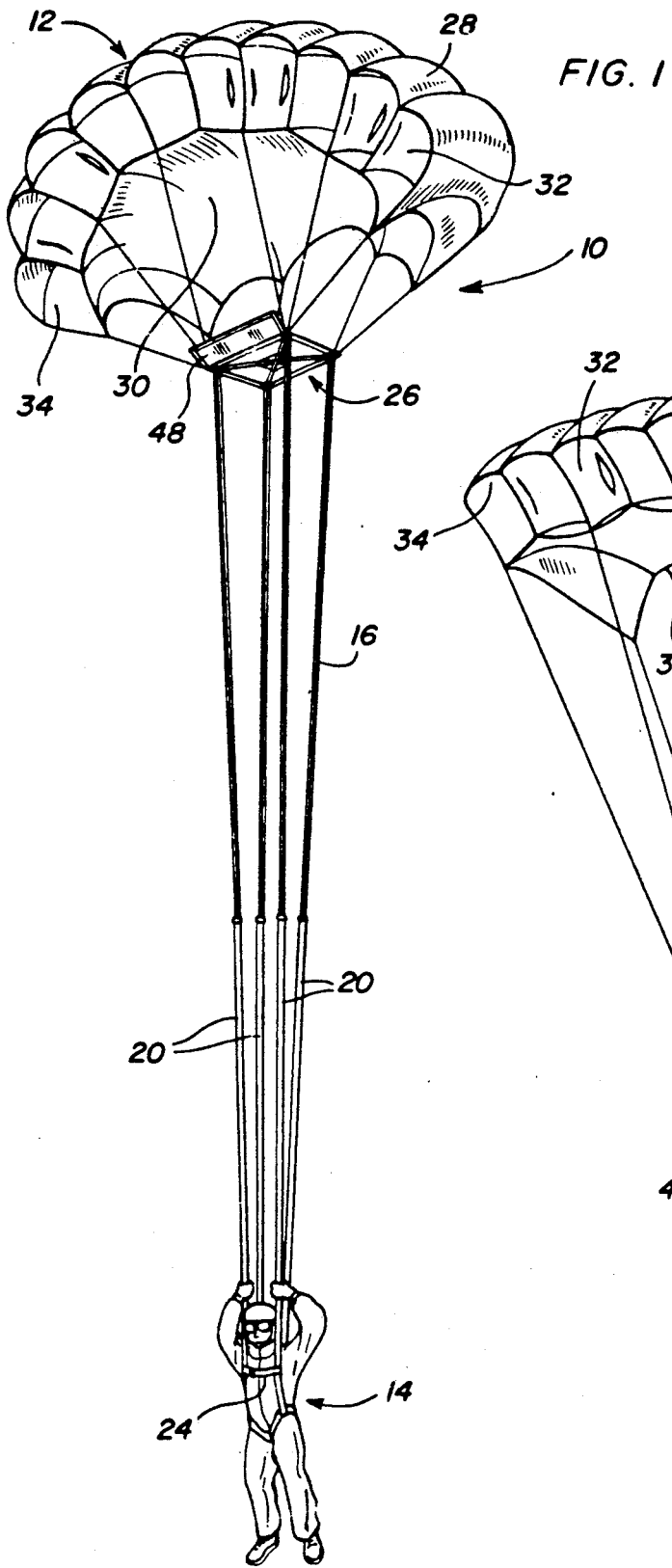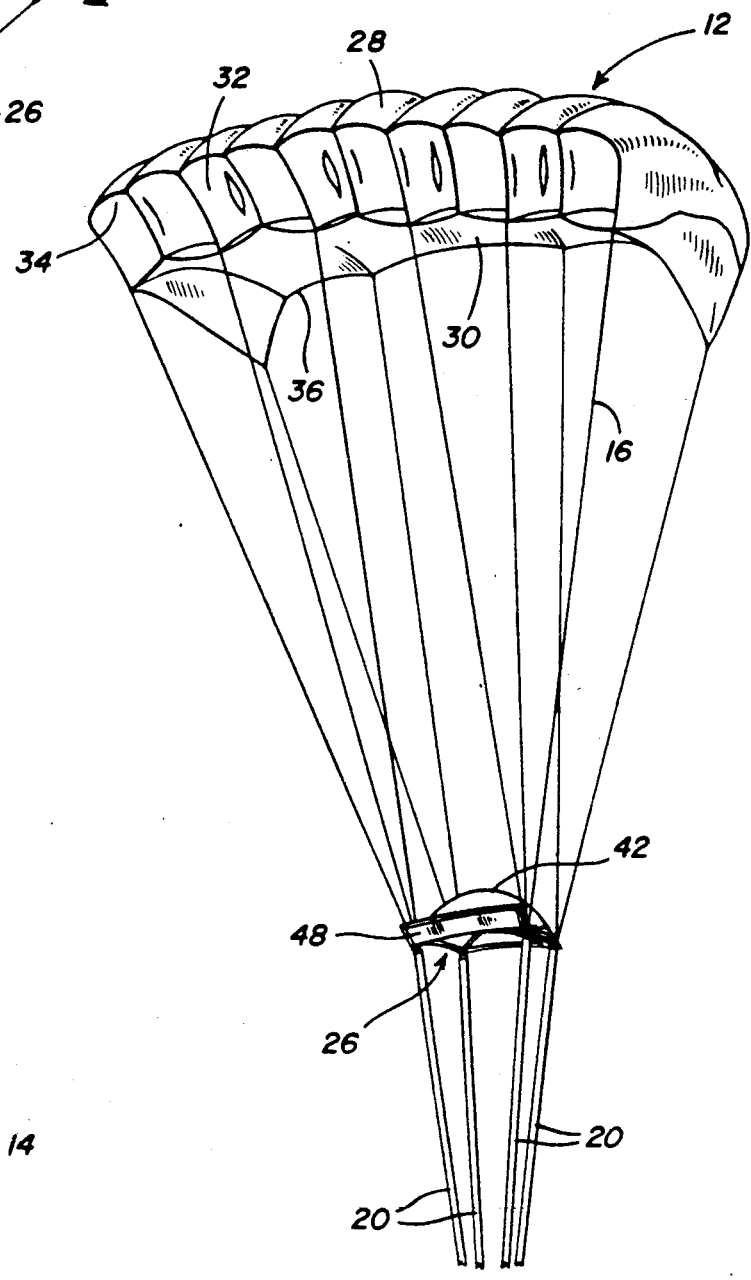

HIGH DRAG SLIDER REEFING SYSTEM FOR PARACHUTES

BACKGROUND OF THE INVENTION

This invention relates in general to delaying the opening of parachute canopies and in particular canopies of the ram air-inflated airfoil type.

The mechanical reefing of parachute canopies by sliders on the canopy suspension lines for the purpose of delaying canopy opening and/or reducing canopy opening shock is already well known as disclosed, for example, in U.S. Pat. Nos. 1,266,508, 2,566,585 and 2,754,074 to Ludtke, Smith and Schade, respectively. According to such prior art arrangements, opening of hemispherical canopies is physically restricted to a decreasing extent as the reefing sliders are displaced downwardly from an upper reefing position along converging suspension lines under canopy opening forces. Such descent of the slider reefing device is aerodynamically retarded according to the Smith and Schade patents. The use of such a conventional slider reefing device for a ram-air inflated airfoil canopy of a glide parachute was more recently shown in U.S. Pat. No. 4,540,145 to Matsuo. Further, according to the Matsuo patent inflation, of the cells separating the upper and lower airfoil surfaces of the canopy is additionally restricted by mechanically closing of the otherwise open leading edge portion of the canopy through which the inflow of air enters the cells. The reefing system disclosed in the Matsuo patent therefore involves a rather extensive arrangement of canopy attached guide rings and reefing lines to which the slider is connected and a staged line cutting operation which is of costly installation and readily subject to malfunction.

It is therefore an important object of the present invention to provide a less costly yet automatically operative system for delaying the opening of forward gliding parachute canopies of the ram air inflated airfoil type. An additional object is to provide such a system which is both reliable and effective to modulate the canopy inflation and opening process during deployment of the parachute.

SUMMARY OF THE INVENTION

In accordance with the present invention, a conventional slider type reefing device is modified to aerodynamically retard in its descent along the suspension lines with a drag coefficient increased without dimensional sacrifice to prolong physical restriction of the canopy opening process as well as to prolong aerodynamic delay in inflation of the canopy by the inflow of inflating air to the cells of the canopy without any physical connection to the canopy. Such aerodynamic delay is achieved by means of a flow deflecting flap extending from the slider beyond the suspension lines so as to be positioned in operative alignment with the leading edge portion of the canopy in the upper reefing position of the slider reefing device.

The upward flow of air into the slider reefing device during descent is conducted through high porosity baffle supported by the slider mounting frame just below a low porosity, flexible baffle primarily responsible for the aerodynamic drag retarding descent of the reefing device from the upper reefing position below the lower airfoil surface of the canopy. The air deflecting effect of the flow deflecting flap is thereby prolonged with an increased drag coefficient.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of an initially deployed parachute with one embodiment of the reefing system of the present invention installed thereon.

FIG. 2 is a partial perspective view of the parachute shown in FIG. 1, in a fully inflated and opened condition.

FIGS. 7 and 9 are partial perspective views respectively showing other embodiments of the invention.

DETAILED DESCRIPTION OF THE PREFERRED EMBODIMENT

Figure 3:
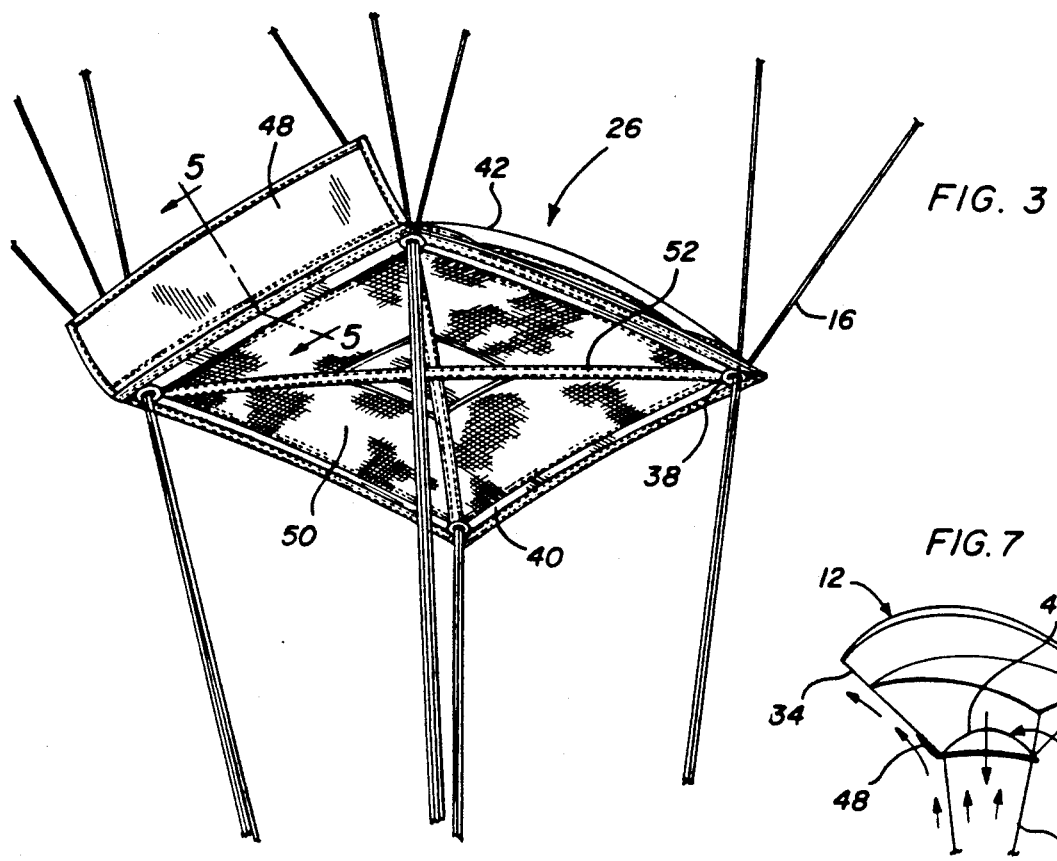
FIG. 3 is an enlarged partial perspective view showing the underside of the reefing device associated with the parachute shown in FIGS. 1 and 2.

Referring now to the drawings in detail, FIG. 1 illustrates a ram air inflated, airfoil gliding parachute, generally referred to by reference numeral 10, in an initially deployed condition. The parachute includes a canopy 12, shown partially inflated in FIG. 1, from which a payload or chutist 14 is suspended by means of a plurality of suspension lines 16 connected at their lower ends to riser straps 20 extending from the payload harness 24. In the embodiment shown, groups of adjacent suspension lines 16 are anchored at their lower ends to four riser straps 20 which limit descent of a reefing slider device 26 from an upper operative reefing position as shown in FIG. 1 to a lower position as shown in FIG. 2. Except for the reefing device 26, the foregoing parachute arrangement and associated hardware is generally well known.

The canopy 12 is of a forward glide airfoil type having upper and lower flexible airfoil surfaces 28 and 30 separated by ram air inflated cells formed between chordwise extending ribs 32. The airfoil shaped surfaces 28 and 30 thus extend chordwise from an open leading edge portion 34 to a trailing edge portion 36 in the direction of forward glide. When the parachute is deployed, the canopy is normally inflated by inflow of air into the cells between ribs 32 at the open leading edge portion 34 as is already well known in the art. Such inflation causes the canopy to become fully extended in both the chordwise and spanwise directions to rapidly assume the shape shown in FIG. 2. However, in accordance with the present invention inflation of the canopy is delayed, restricted or modulated during descent of the parachute by the reefing device 26 as it descends relative to the canopy from its upper position as shown in FIG. 1 to its lower position as shown in FIG. 2.

As more clearly seen in FIGS. 3-6, the reefing device 26 includes a plurality of slider grommets 38 which are interconnected in spaced relation to each other by a peripheral fabric mounting frame 40. In the illustrated embodiment, there are four slider grommets 38 located at the corners of the rectangular-shaped peripheral frame 40. The aforementioned four groups of suspension lines 16 respectively extend slidably through the grommets 38 to guide descent of the reefing device and physically restrict the opening or spreading of the canopy under ram air inflation forces.

Canopy opening forces exerted on the reefing device 26 to ordinarily cause its downward descent along the converging suspension lines, are opposed by upward drag forces exerted on a drag chute formed by a relatively low porosity, flexible baffle 42. The baffle 42 has a peripheral edge 44 that is secured at spaced locations 46 to the peripheral mounting frame 40 as more clearly seen in FIG. 6. The drag baffle 42 will accordingly retard the descent of the reefing device from its upper position just below the lower surface 30 of the canopy 12.

In the upper position of the reefing device, one side of the rectangular mounting frame 40 hingedly mounts an airflow deflector 48 to extend therefrom beyond the extension lines as shown so as to be positioned in operative alignment with the leading edge portion 34 of the canopy 12. Thus, during descent of the parachute the upward flow of air induced relative to the canopy of the parachute the upward flow of air induced relative to the canopy 12 not only aerodynamically produces the drag forces on the baffle 42 as aforementioned but also upwardly deflects the deflector 48 as diagrammed by the arrows in FIG. 7 to aerodynamically divert airflow away from the leading edge portion 34. Inflation of the canopy is thereby delayed with the inflow diverting affect of deflector 48 being gradually reduced as the reefing device descends in a retarded mode because of the drag effect of baffle 42. Such inflow diversion is furthermore achieved without physical or mechanical restriction of the leading edge opening.

The drag coefficient of baffle 42 is ordinarily limited by its dimension which is preferably made as small as possible to provide optimum physical reefing of the canopy through the suspension lines extending through the slider grommets 38. In order to increase the drag coefficient of the entire reefing device without dimensional enlargement, the peripheral mounting frame 40 supports a relatively high porosity, baffle panel 50 through which the upward flow of air passes to inflate the drag chute baffle 42. The baffle panel 50 has reinforcements 52 in its structure as more cearly seen in FIG. 3 to substantially maintain the frame 40 and sliders 38 in a common plane above which the drag baffle 42 is inflated. As a result of the foregoing arrangement, the drag coefficient has been unexpectedly increased by a ratio of 1.6 to 1. The increased drag serves a two-fold purpose in prolonging the physical restricting affect of the reefing device 26 through the suspension lines and the aerodynamic inflow diverting affect of the flow deflector 48.

Figure 7:
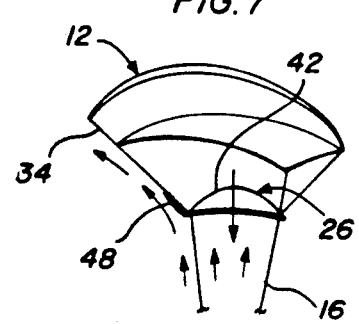
FIG. 7 is a schematic side elevational view showing the reefing action of the system depicted in FIGS. 1-6.
Figure 4:
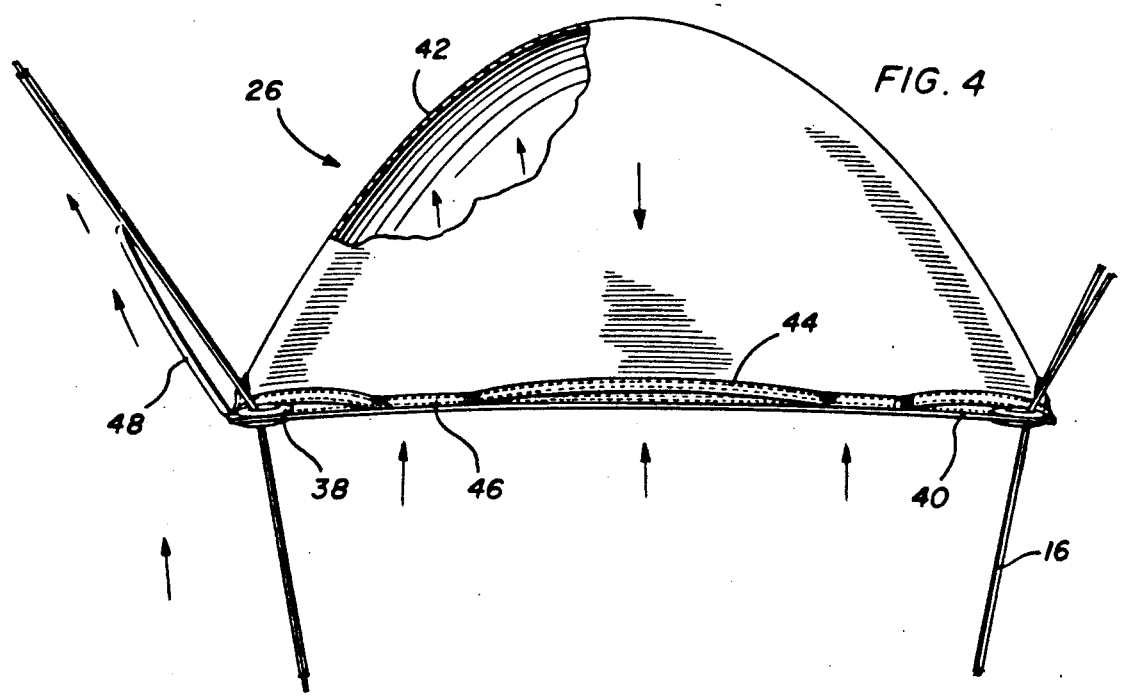
FIG. 4 is an enlarged side elevational view of the reefing device shown in FIG. 3, with a part broken away and shown in section.
Figure 5:
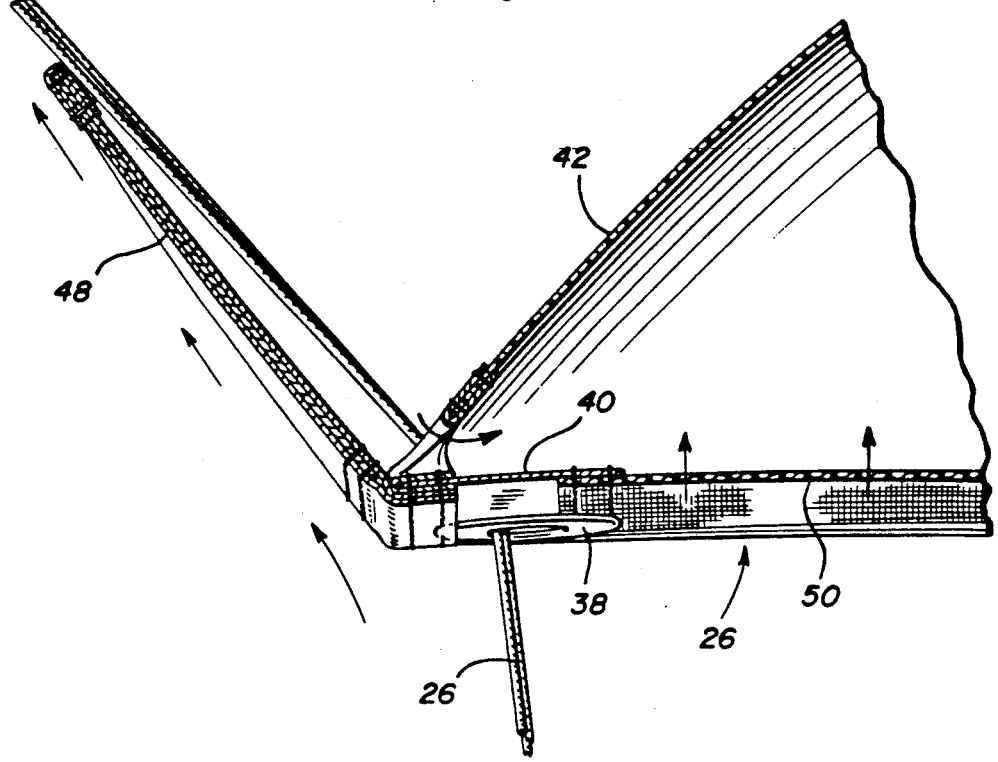
FIG. 5 is an enlarged partial sectional view taken substantially through a plane indicated by section line 5—5 in FIG. 3.
Figure 6:
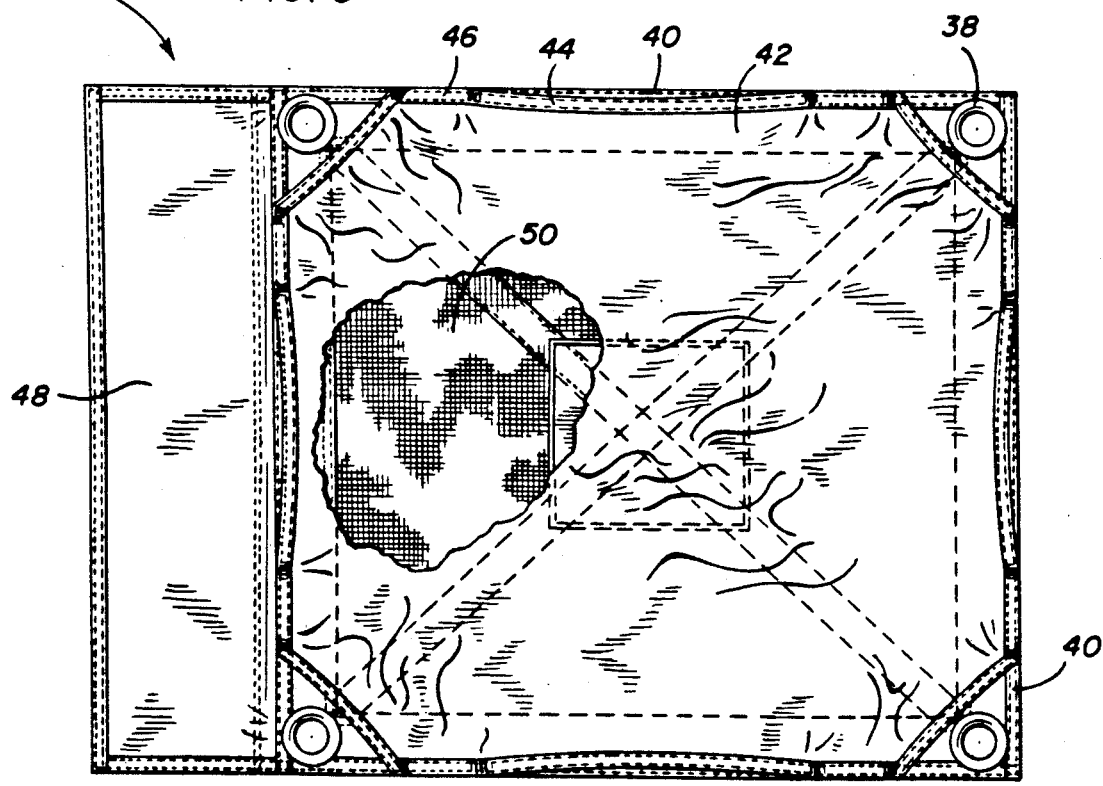
FIG. 6 is a top plan view of the reefing device shown in FIGS. 3-5, with a part broken away and shown in section.
Figure 7:
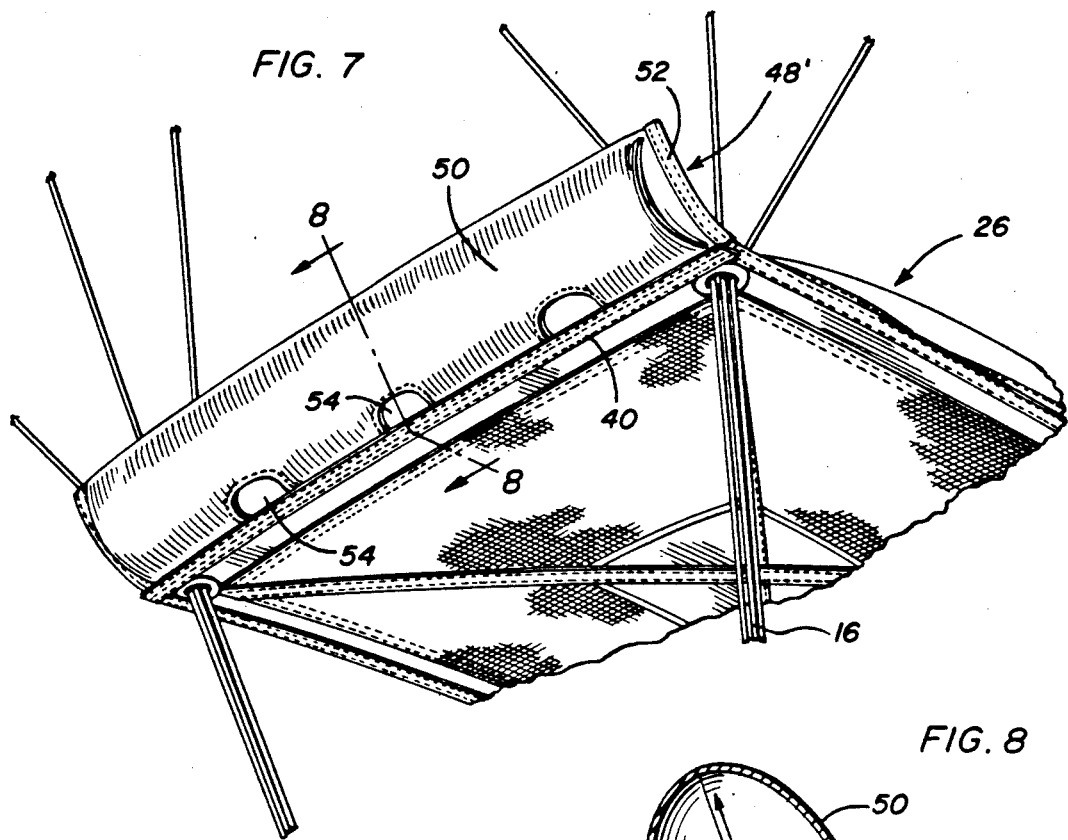
Figure 8:
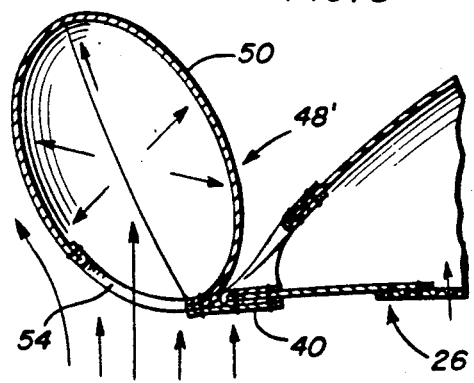
FIGS. 8 and 10 are enlarged partial sectional views respectively taken through planes indicated by section lines 8—8 and 10—10 in FIGS. 7 and 9.

The flow deflector 48 as shown in FIGS. 1-6, is made from a relatively stiff fabric construction having sufficient rigidity to deflect the inflating airflow as described. FIGS. 7 and 8 show another embodiment in which a relatively flexible flow deflector 48' is utilized. The flow deflector 48' is in the form of an envelope 53 made of a relatively flexible, non-porous fabric secured to one side of the frame 40 of the reefing slider 26. The ends of the envelope 53 are sealed by hem formations 52. Openings 54 are formed in the envelope 53 adjacent to the frame 40 to which it is secured. The upward flow of air relative to the slider 26 as shown in FIG. 8 inflates or internally pressurizes the envelope 53 to render the flow deflector flap 48' relatively rigid so as to effectively divert or deflect the airflow as shown.

Figure 9:
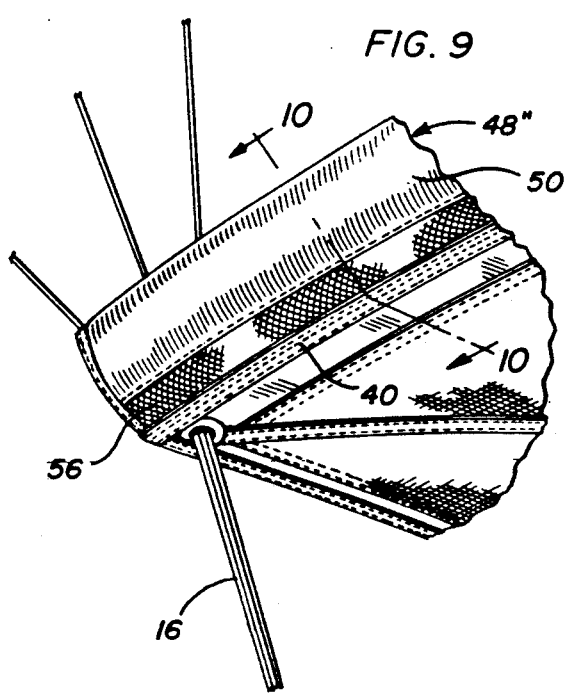
Figure 10:
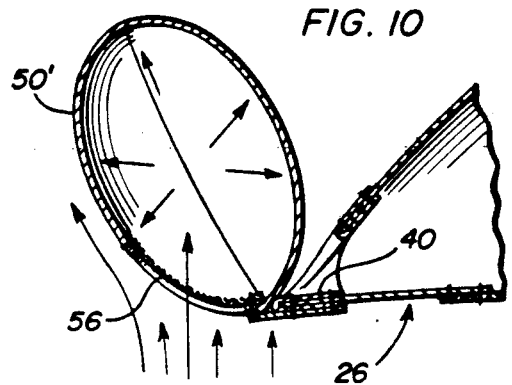

A flexible flow deflector 48" similar to that of flow deflector 48' is shown in FIGS. 9 and 10, also utilizing an envelope type of flap 53' sealed at the ends and secured between ends to the slider frame 40. In this embodiment, an elongated opening is formed in the envelope adjacent the frame 40, closed by a relatively porous strip 56 through which air enters to internally pressurize the envelope flap. The flexible deflector 48" will therefore also be rigidified by the flow of air impinging on the reefing slider during canopy descent so as to effectively divert the canopy inflating airflow as hereinbefore described with respect to FIGS. 1-7.

These together with other objects and advantages which will become subsequently apparent reside in the details of construction and operation as more fully hereinafter described and claimed, reference being had to the accompanying drawings forming a part hereof, wherein like numerals refer to like parts throughout.

What is claimed as new is as follows:

1. In combination with a parachute canopy having upper and lower airfoil surfaces separated by chordwise-extending cells inflated by inflow of air at an open leading edge, suspension lines connecting the lower surface of the canopy to a load, a reefing slider through which the extension lines extend and aerodynamic drag means for retarding descent of the slider relative to the canopy from an upper reefing position in which inflation of the canopy is restricted, the improvement comprising means extending beyond the suspension liens for deflecting flow induced by gravitational descent of the canopy and means connecting said flow deflecting means to the drag means in operative alignment with the leading edge of the canopy for diverting said inflow into the cells in the upper reefing position of the slider to delay inflation of the canopy, said drag means including a relatively high porosity baffle connected to the reefing slider, a relatively low porosity baffle and means peripherally securing the low porosity baffle to the high porosity baffle to form a drag chute thereabove inflated by said flow induced during said descent of the canopy.

2. In combination with a parachute canopy having upper and lower airfoil surfaces separated by chordwise-extending cells inflated by inflow of air at an open leading edge, suspension lines connecting the lower surface of the canopy to a load, a reefing slider through which the extension lines extend and aerodynamic drag means for retarding descent of the slider relative to the canopy from an upper reefing position, said drag means including a flexible baffle of relatively low porosity, peripheral frame means for connecting the slider to the flexible baffle to dimensionally limit the size thereof and relatively high porosity means supported by the peripheral frame means through which air passes to inflate the flexible baffle for substantially increasing the drag coefficient of the drag means.

3. The improvement as defined in claim 2 further including airflow deflecting means mounted by the frame means and extending therefrom beyond the suspensions lines in operative alignment with the leading edge of the canopy for diverting said inflow into the cells in the upper reefing position of the slider to delay inflation of the canopy.

4. In combination with a parachute canopy having upper and lower airfoil surfaces separated by chordwise-extending cells inflated by inflow of air at an open leading edge, suspension lines connecting the lower surface of the canopy to a load and a reefing slider having an outer peripheral portion through which the suspension lines extend, the improvement including a flow deflector, means connecting the flow deflector to the peripheral portion of the slider for initially diverting said inflow into the cells of the canopy to delay inflation thereof and aerodynamic drag means connected to the slider for retarding displacement of the flow deflector from the canopy, the drag means including a flexible baffle of relatively low porosity, peripheral mounting means for connecting the slider to the flexible baffle to dimensionally limit the size thereof and relatively high porosity means supported by the peripheral mounting means through which air passes to inflate the flexible baffle for substantially increasing the drag coefficient of the drag means.

5. In combination with a parachute canopy inflated to an airfoil shape by an inflow of air at a leading edge portion thereof and a plurality of suspension lines connected to the canopy, a system for delaying opening of the canopy comprising a reefing slider through which said suspension lines extend and means connected to the slider independently of the canopy for aerodynamically diverting said inflow into the canopy at the leading edge portion to delay inflation thereof, said aerodynamic inflow diverting means including a flow deflecting flap hingedly connected to the slider in operative alignment with the leading edge portion of the canopy, said flow deflecting flap comprising a flexible envelope and flap rigidifying means responsive to descent of the canopy for internally pressuring the envelope.

6. The system as defined in claim 5 wherein said flap rigidifying means includes an inflow opening in the envelope.

7. The system as defined in claim 5 further including aerodynamic drag means mounted on the slider for prolonging the inflation delaying affect of the inflow diverting means.

8. The system as defined in claim 7 wherein said aerodynamic inflow diverting means comprises a flow deflecting flap hingedly connected to the slider in operative alignment with the leading edge portion of the canopy.

9. The reefing system as defined in claim 8 wherein said flow deflecting flap is made of a relatively stiff fabric construction.

10. The system as defined in claim 7 wherein said flap rigidifying means includes an inflow opening in the envelope.

* * * * *